July 25, 1944.  M. R. HARRIS  2,354,313
WELDING MACHINE
Filed July 24, 1939  3 Sheets-Sheet 2

Inventor
Marcus R. Harris
By Blackmore, Spencer & Flint
Attorneys

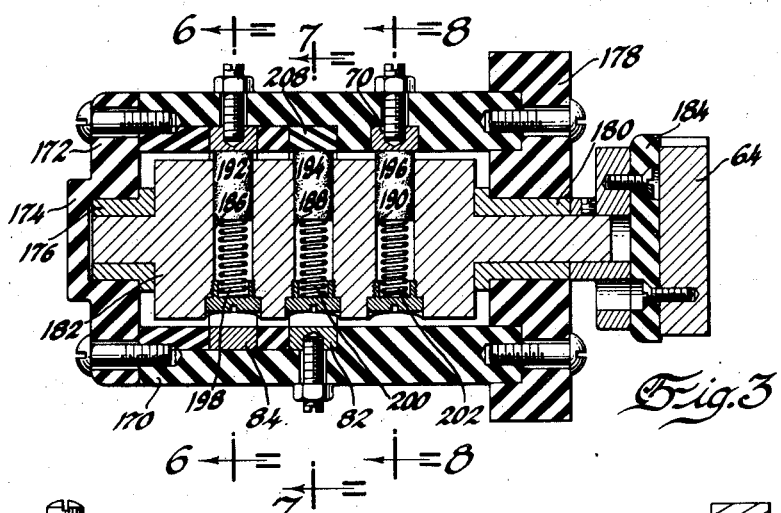
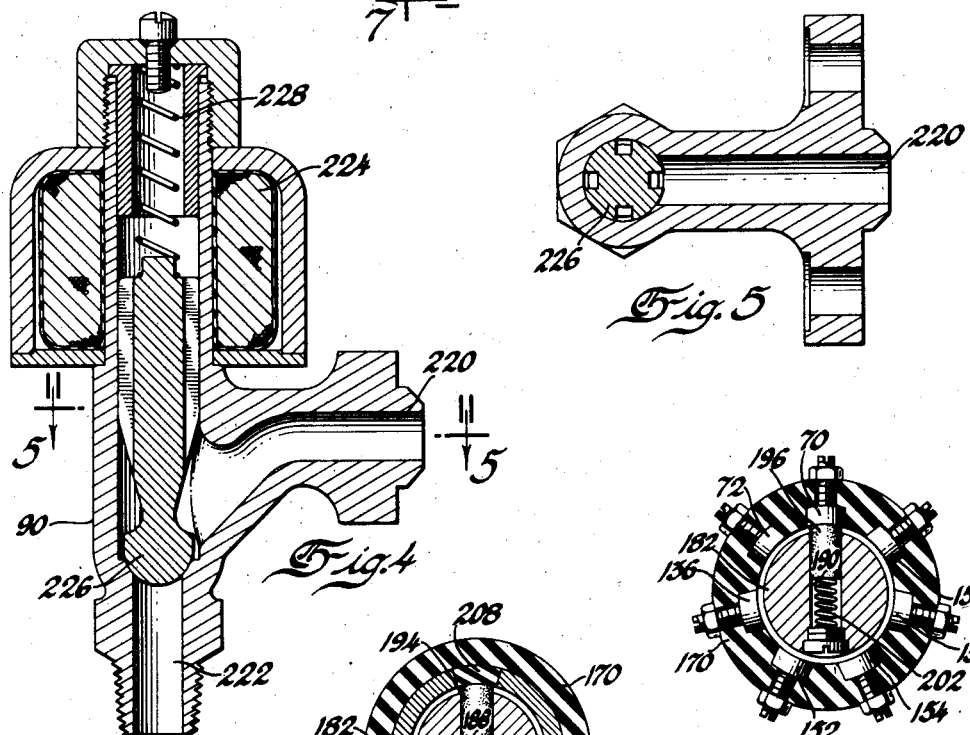
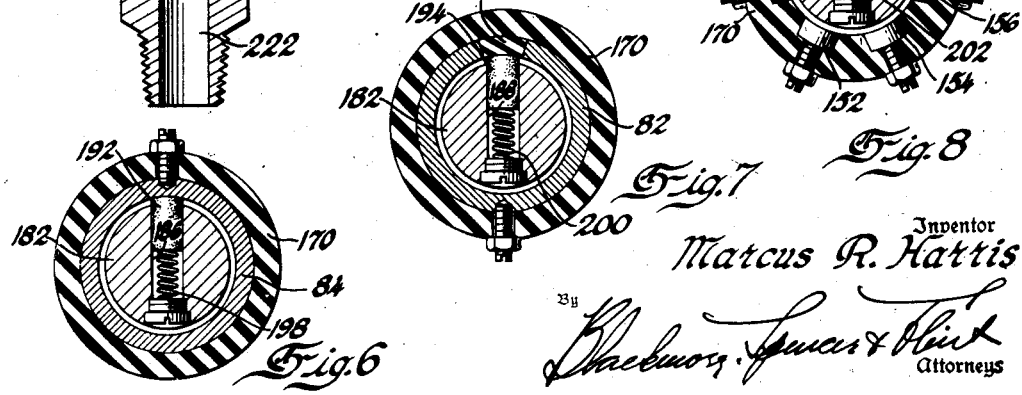

Patented July 25, 1944

2,354,313

UNITED STATES PATENT OFFICE 2,354,313

WELDING MACHINE

Marcus R. Harris, Indianapolis, Ind., assignor to General Motors Corporation, Detroit, Mich., a corporation of Delaware Application July 24, 1939, Serial No. 286,114

4 Claims. (Cl. 219—4)

This invention relates to electric welding and has particularly to do with electric resistance welding apparatus adapted to make a series of spot welds.

The welding apparatus of the invention is one in which the welding electrodes are forced into contact with the work to be welded by fluid or hydraulic pressure means. The device is adapted to automatically make a series of spot welds, the operation of the machine being controlled by a fluid or hydraulically operated indexing switch and repeating device. The welding apparatus of the present invention differs from forms of automatic hydraulic pressure actuated welding devices commonly used in that no motor driven pressure generating device is used and all valve operating, valve switching and repeating is accomplished during a "no-pressure," "no-current" period of operation. In addition, the repeat action, being hydraulically operated, is at all times in direction relation and time, with welding pressure on the welding electrodes, regardless of change in pressure or viscosity of hydraulic fluid, thereby giving automatic compensation for these factors.

There are three fundamentals to be considered in spot welding, i. e., pressure, current and time. The three may vary according to the weld to be made, but all three must be considered, and each has a definite relation to the other in the complete cycle of a weld. The first phase of making a weld is to apply sufficient pressure on welding electrodes to give a better electrical connection between the electrodes and the parts to be welded, than between the parts to be welded. Next electrical current must be supplied after the electrodes have the required pressure applied thereto. It is quite important that the current be applied after the required pressure is applied. The amount of electrical current will depend on the material to be welded and other electrical conditions. Lastly, it is equally as important that the current be "cut off" before the pressure is relieved from the electrodes, as it is to have the pressure applied before the current is supplied. The length of time or "holding time" for maintaining the pressure on the electrodes after the welding current has been cut off depends on the material being welded and other characteristics of the welding apparatus.

In commonly used multiple spot welding machines, hydraulic pressure is generated by means of a pump using oil as a medium. Hydraulic pressure is supplied from a "central station" and in one common form of welding machine is distributed to the several welding guns by means of a revolving disc with ports to the welding guns. Timing of the application of pressure is accomplished, in the device just described, by revolving the disc by means of an electric motor or air motor which may be varied by means of a step pulley in the first case, and valving the air in the second case. In the common forms of hydraulically actuated multiple spot welding machines the pressure generating pump runs continuously causing the oil to heat from the constant churning, thereby lowering the viscosity of the oil. From the time pressure is applied, other cams, etc., are used to control the application of current, control the current time, and the time pressure is left on after the current is interrupted.

The disadvantage of the commonly used hydraulic pressure actuated welding devices just described is that the three fundamentals mentioned above are not all controlled by the same medium. This means that the device gets out of adjustment when the viscosity of the hydraulic pressure medium varies. In a device constructed in accordance with this invention the three fundamentals are controlled by the same medium so that if the characteristics of this medium changes the relation of the three fundamentals to each other does not change.

The primary object of this invention is to provide an improved welding machine adapted to make sequentially a series of welds. Other objects and advantages of this invention will be better understood from the accompanying drawings and from the following detailed specification which illustrate an embodiment of the invention. In the drawings:

Figure 3 is a sectional view substantially on line 3—3 in Figure 2.

Figure 4 is a sectional view on line 4—4 in Figure 2.

Figure 5 is a sectional view substantially on line 5—5 in Figure 4.

Figure 6 is a sectional view on line 6—6 in Figure 3.

Figure 7 is a sectional view on line 7—7 in Figure 3.

Figure 8 is a sectional view on line 8—8 in Figure 3.

Figure 1:
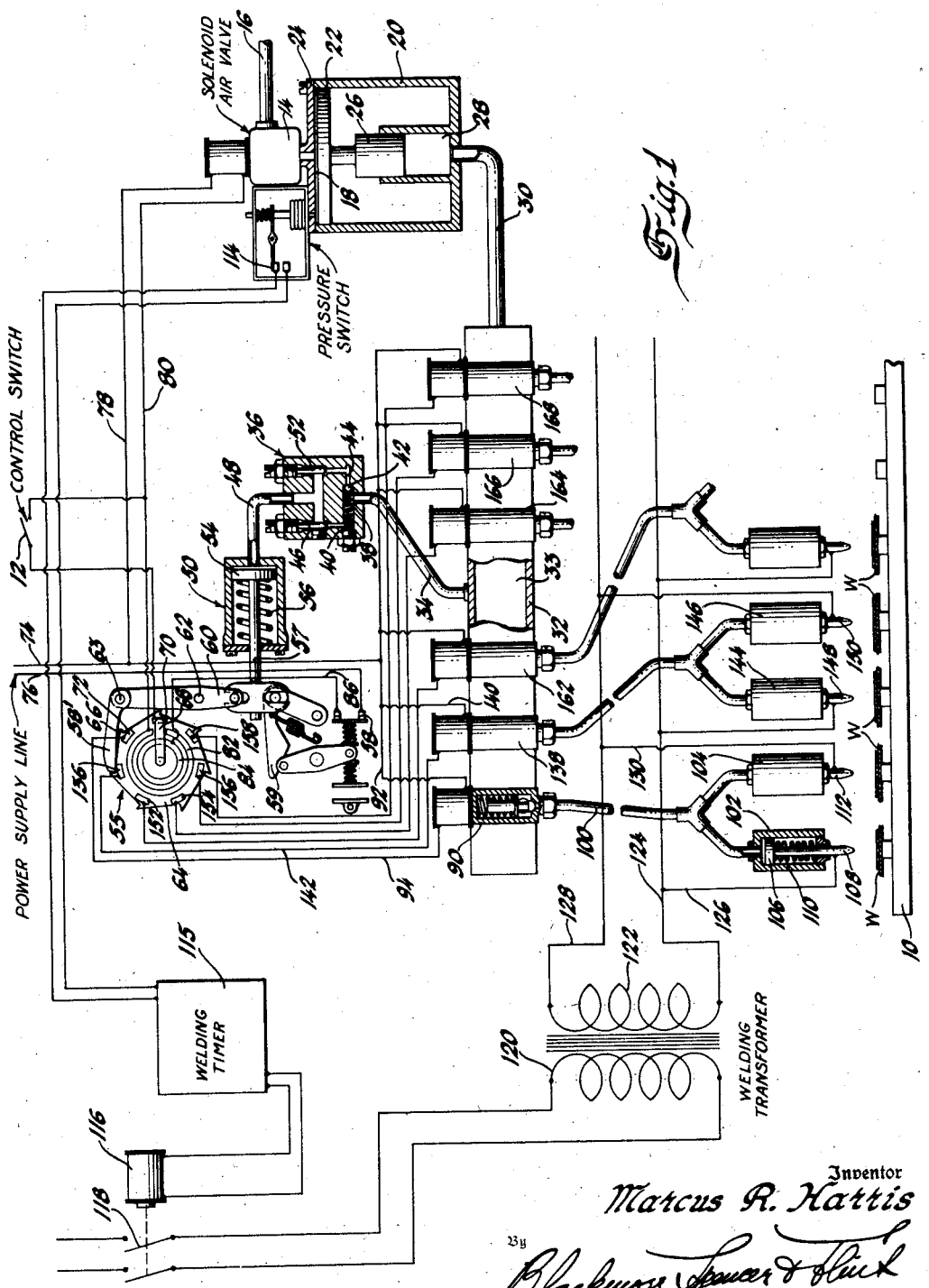
Figure 1 is a somewhat diagrammatic view with certain parts in section of a welder constructed in accordance with the invention.

In Figure 1 of the drawings is illustrated somewhat diagrammatically a welding device in accordance with my invention, the several parts being in neutral position prior to the start of a cycle of spot welding operations.

With the several parts to be welded W arranged in proper position on a welding jig or fixture 10, a control switch 12 is closed by the operator of the machine to start a series or cycle of spot welding operations, the action being entirely automatic thereafter until the cycle is completed.

Closing of switch 12 completes an electrical circuit to a solenoid actuated air valve 14 to admit air from compressed air line 16 to an air chamber 18 formed by cylinder 20, piston 22 and closure member 24. To piston 22 is fixed a smaller piston 26 movably mounted in cylinder 28. Within the lower portion of cylinder 28 is a suitable hydraulic pressure conducting fluid such as oil, for example. A suitable fluid conducting line 30 leads to a manifold 32 having a reservoir or chamber 33 for fluid extending substantially the entire length thereof. A fluid conducting passage 34 leads from the manifold to a flow regulating device shown generally at 36. The flow regulating means shown comprises a passage 38 within which is an adjustable spring means 40 biasing a ball check valve 42 to the right, as seen in Figure 1, thus closing passage 44. An adjustable needle valve 46 regulates the flow of oil to a line 48 leading to a control cylinder 50 fixed in position on the machine. A second adjustable needle valve 52 regulates the return flow of oil in passage 44.

Pressure in cylinder 50 causes piston 54 to be moved to the left in Figure 1 against the force of coil spring 56. This trips switch 58 by cam means 59 moved by piston rod 57 and breaks the circuit leading to the solenoid actuated air valve 14 with a resultant discharge of air from air chamber 18 and causes the hydraulic pressure in cylinder 28 to drop. This permits the coil spring 56 to return the piston 54 to starting position. The speed of return of piston 54 is regulated by the adjustable needle valves 46 and 52.

Movement of piston 54 also causes the actuation of an indexing switch and repeating device indicated generally at 55. In moving to the left the piston 54 moves the pawl 58' of the indexing switch and repeating device to the right in Figure 1 by means of lever 60 pivotally mounted at 62. The pawl is pivotally connected at 63 to the upper end of lever 60. A spring (not shown) as is usual in pawl and ratchet mechanism, holds the pawl in contact with the ratchet wheel 64. Upon the return of the piston 54 to the right, the pawl, which has been moved far enough to the right to fall behind tooth 66 of the ratchet wheel on the forward motion of the piston, now moves the ratchet wheel counterclockwise as viewed in Figure 1. This moves the movable switch element 68 from contact 70 to contact 72. Movement of the piston 54 to the right in Figure 1 also causes switch 58 to be moved to the right to closing position by cam means 59. This immediately closes the circuit from opposite sides 74, 76 of a power supply line to the solenoid air valve 14 to again build up the hydraulic pressure in the manifold. The circuit from 74 to 76 is, by means of lead 78 to the solenoid of the air valve, lead 80 including the solenoid winding and the lead returning from the solenoid to collector segment 82, movable switch element 68, conductor ring member 84, lead 86 from the conductor ring to the switch 58 and thus to the side 76 of the power supply line.

In addition to completing the electrical circuit through the solenoid of the solenoid air valve, the movable switch element 68 when moved into engagement with contact 72 completes a circuit from the power supply line to a first solenoid actuated valve indicated generally at 90. The circuit from side 74 of the power supply line is lead 92, the solenoid winding, lead 94, contact 72, movable switch element 68, ring 84, lead 86, switch 58 and thence to the opposite side 76 of the power supply line.

Actuation of the valve 90 permits the fluid pressure built up in the pressure chamber of the manifold to flow into the hydraulic line 100 leading to a plurality of cylinders 102, 104 fixed in position above the work to be welded. Within cylinder 102 is a piston 106 connected to a welding electrode 108 and a spring 110 in the cylinder below the piston tending to force the piston and electrode away from the work. When the solenoid actuated valve 90 is opened and hydraulic pressure is built up in pipe line 100 the piston in cylinder 102 and electrode are moved against the pressure of compressed spring 110 into pressure engagement with the work to be welded. Within cylinder 104 is a piston similar to piston 106 and actuated in a similar manner. An electrode 112 is moved by the piston of cylinder 106 into pressure engagement with the work.

After the hydraulic pressure in the fluid pressure system has forced the electrodes 108 and 112 into engagement with the work, the hydraulic pressure continues to build up to a point where the back pressure switch 114 is closed by air pressure in chamber 24 to thereby complete a circuit including the electrical connections of any suitable welding timer 115 and a solenoid 116, which latter actuates a switch 118 to complete a circuit leading from a power line to the primary 120 of a welding transformer. One side of the secondary 122 is connected to electrode 108 by leads 124 and 126, while the opposite side of the secondary is connected to electrode 112 by leads 128 and 130. The work W being welded and the jig or fixture completes the welding circuit which includes the secondary of the welding transformer. Thus two spot welds are performed at one time in the device shown in the drawings. It will be understood that, if desired, a single electrode electrically connected to one side of the secondary of the welding transformer may be forced into pressure engagement with the work to be welded, the opposite side of the secondary of the welding transformer being electrically connected to the jig or fixture supporting the work. In this form of the invention a single weld will be formed in each position of the indexing switch.

Welding timer 115 is of any suitable conventional type, of which there are many kinds available commercially. The timer is so constructed and adjusted as to open switch 118 and thus break the circuit leading to the welding transformer after the weld is completed but before the pressure on the welding electrodes is released.

The pressure in the manifold in addition to forcing the electrodes into contact with the work to be welded also flows into control cylinder 50 to move piston 54 to the left to actuate the pawl of the pawl and ratchet mechanism and trip switch 58 to thereby break the circuit leading to the winding of the solenoid air valve so that the solenoid air valve is deenergized again so as to allow the hydraulic pressure in the manifold to drop and return the piston 54 to the right. This moves the movable element 68 of the selector switch to contactor 136 of the indexing switch and closes the switch 58 to complete again the electric circuit to energize the solenoid air valve and thereby build up hydraulic pressure in the manifold. In position 136 a circuit is completed to a solenoid actuated valve 138 identical in construction with solenoid actuated valve 90, the complete circuit from power line 74 to 76 being as follows: 74, lead 140, the winding of the solenoid of solenoid actuated valve 138, lead 142, contact 136, movable switch element 68, ring member 84, lead 86, switch 58 and thus to the opposite side 76 of the power supply line. The solenoid actuated valve is adapted to open when energized and allow hydraulic fluid from the manifold to flow to a pair of cylinders 144 and 146 similar to cylinders 102 and 104. A pair of electrodes 148 and 150 are actuated by fluid pressure within the respective cylinders in a manner similar to that described in connection with cylinders 102 and 104.

Other contactors 152, 154, 156 and 158 form elements of electrical circuits leading to solenoid actuated valves 162, 164, 166 and 168, respectively. The constructions of these other contactors and solenoid actuated valves are identical to those previously described and need not be further described.

Figure 2:
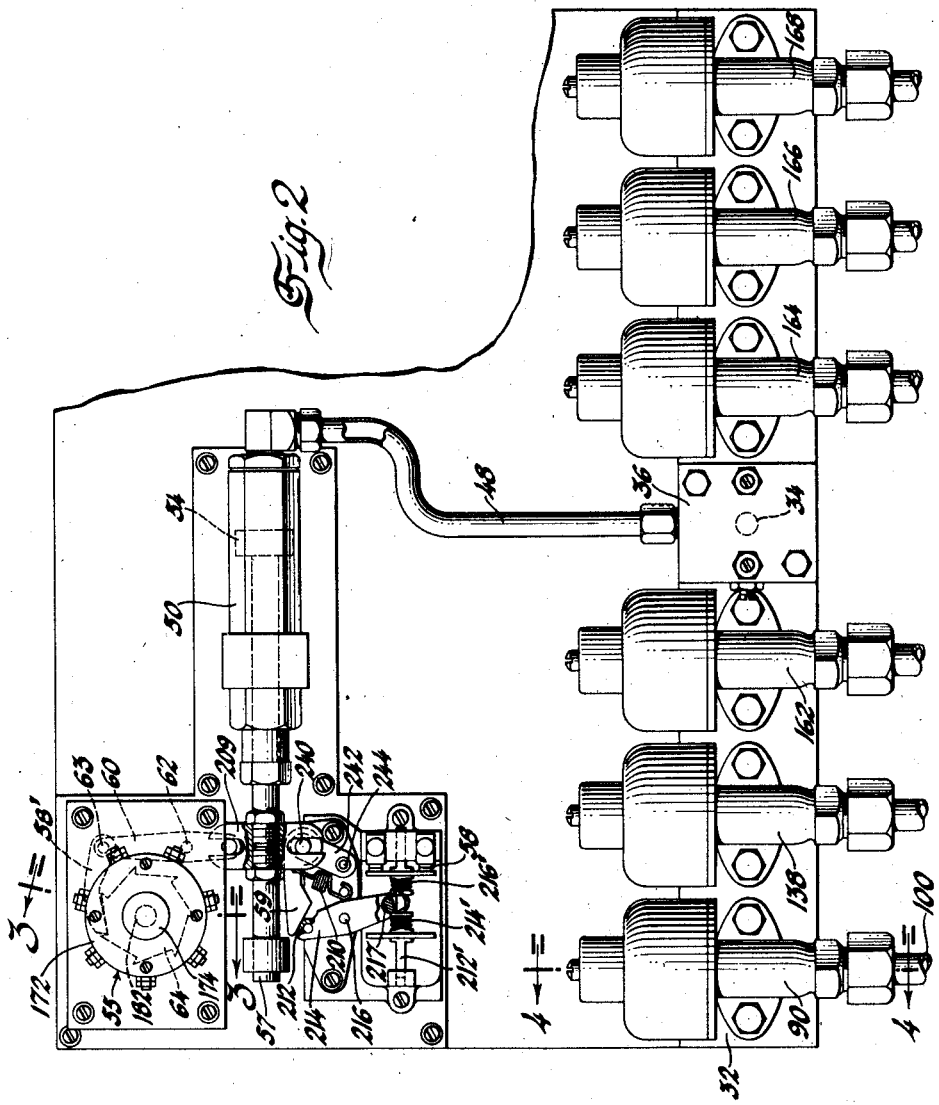
Figure 2 is a view on an enlarged scale of a portion of the device illustrated in Figure 1 and showing in greater detail the construction of a ratchet operated indexing switch and repeat mechanism.

The details of the ratchet operated indexing switch means, the action of which is described in connection with the description of the diagrammatic showing in Figure 1, are illustrated more completely in Figures 2, 3, 6, 7 and 8. In these latter figures certain parts of the indexing switch means are shown in different positions than in the diagrammatic showing of Figure 1. In Figures 2, 3, 6, 7 and 8 the indexing switch assembly includes a housing in fixed position and formed of insulating material. The housing is made up of a sleeve member 170, to which at one end is fixed a first plate member 172 having a portion 174 adapted to receive a bearing 176. At the other end of the sleeve 170 is a second plate member 178 having an opening at the center thereof within which is a bearing 180. Bearings 176 and 180 support a rotatable member or rotor 182 within the sleeve, the rotor being of smaller diameter than is the inner diameter of the sleeve and being formed of suitable current conducting material. Rotor 182 is secured to the ratchet wheel 64 and electrically insulated therefrom by means of insulator 184. Openings 186, 188 and 190 extending diametrically of the rotor have carbon brushes 192, 194 and 196, respectively mounted therein. Rotor 182 and the carbon brushes constitute the member indicated diagrammatically at 68 in Figure 1. Coil springs 198, 200, and 202 are mounted within the openings in the rotor and behind the brushes and force the carbon brushes outwardly, brush 192 thus being resiliently held in current conducting relation with conductor ring 84, while brush 194 is resiliently held in contact with collector segment 82 and insulator segment 208, the two segments forming a ring, while the third brush 196 is resiliently held in engagement with portions of the inner surface of the insulated sleeve 170 and with the several contactors 70, 72, 136, 152, 154, 156 and 158 secured to the insulated sleeve. The contactors have their inner faces flush with, and of the same curvature as, the inner face of the sleeve. It will be seen that the contactors and collector segment in Figure 2 are positioned differently than in the schematic showing in Figure 1. The showing in the latter figure is for purpose of description.

The mechanism whereby the movable piston 54 actuates the trip switch 58 is illustrated in detail in Figure 2. As the piston moves to the left in this figure a member 209 having slotted ends and fixed to the piston rod 57 is also moved to the left. In the lower of the slotted ends is a pin 240 to which is pivotally mounted the cam member 59. Pin 240 is carried by one end of an arm 242 pivoted at 244 to a fixed portion of the machine. A coil spring 210 having one end fixed to the cam member and the other end fixed to a stationary part of the machine tends to move the cam 59 counterclockwise as viewed in Figure 2 as will be readily understood. This holds the cam in resilient contact with a roller 212 carried by the free end of an arm 214 pivoted at 216 to a fixed portion of the welder. The opposite end 217 of the arm 214 is adapted to actuate a slidable actuator rod 212' for switch 58. Springs 214' and 216' form a yieldable means between the arm and rod. When the apex of the cam passes over the roller it snaps the switch to the left due to the tension of spring 210.

The specific construction of the solenoid actuated valves which permit the transmission of hydraulic pressure from the pressure chamber in the manifold to the cylinders for actuating the welding electrodes is best seen in Figures 2, 4 and 5. The solenoid actuated valve indicated generally at 90 comprises a passage 220 leading to the pressure chamber in the manifold and a second passage 222 leading to the hydraulic line 100 leading to the pair of cylinders 102, 104. A solenoid winding 224 is adapted to be energized to pull the movable valve member 226 from seating position where it closes the passage 100 to the cylinders 102, 104 to open position against the pressure of coil spring 228. When the solenoid winding is deenergized the spring 228 biases the valve member 226 to closing position. The constructions of the other solenoid actuated valves 138, 162, 164, 166 and 168 are the same as the specific construction of valve 90.

If desired to form a greater or lesser number of welds in the series it is only necessary to change the number of contactors, electrical leads, solenoid actuated valves, welding electrodes and associated structure.

The mode of operation of the device is thought to be sufficiently described above but may be briefly summarized. The work to be welded is first placed in position on the welding jig or fixture. The operator closes the control switch to start the welder on the cycle of operation. Thereafter the action is entirely automatic until the cycle is completed. On the closing of the control switch the solenoid actuated air valve is opened to allow air pressure to build up and thereby force the piston 26 downwardly to build up hydraulic pressure in the manifold. This in turn causes the piston 54 to move and thus break the circuit leading to the solenoid air valve through the opening of switch 58. Return movement of the piston 54 actuates the ratchet to move the rotatable switch to a contact position such that as the switch 58 is closed a circuit to the solenoid actuated valve 90 is completed and the valve opened. The first pair of electrodes is thereafter forced into pressure engagement with the work as the pressure is built up in the manifold. The back pressure in the air chamber causes the circuit to the welding transformer to be completed after the desired pressure is applied to the welding electrodes and thus the first welding operation is performed. The welding circuit is then broken and thereafter the pressure on the welding electrodes is removed. The other welding operations of the cycle are similarly carried out in sequence automatically. When the cycle is completed the indexing switch is again in its original position, whereupon the operator may start a new cycle by again closing switch 12.

It will be understood that numerous changes and modifications of the embodiment of my invention described herein will be apparent to those skilled in the art without departing from the principles of my invention and I do not intend to limit the patent granted for my invention except as necessitated by the prior art.

I claim:

1. In electric welding apparatus adapted to make a series of welds, a fluid pressure chamber, means for causing a rise and fall of fluid pressure in said chamber, an indexing switch, means actuated by the rise and fall of fluid pressure in said chamber for moving said indexing switch to different positions, a series of welding electrodes, a series of fluid pressure actuated means for forcing the electrodes into contact with the work to be welded, a series of electrically actuated valve means connected with said fluid pressure chamber and with said fluid pressure actuated means for forcing the electrodes into pressure engagement with the work to be welded, a source of electric current, and connections from said source of electric current to said series of electrically actuated valve means, the connection to each electrically actuated valve means including the indexing switch means in a different position thereof.

2. In electric welding apparatus adapted to make sequentially a series of welds, a plurality of welders each having a cylinder and a piston and a welding point forced into pressure engagement with work to be welded by pressure of fluid in said cylinder, a fluid chamber, means for causing pressure in said chamber to rise and fall, a plurality of electrically actuated valves for sequentially connecting said fluid chamber with a different pair of said cylinders, a ratchet operated indexing switch sequentially completing electric circuits to the several electrically actuated valves to cause sequential actuation of these valves, a cylinder and piston connected with said fluid chamber and actuated by the rise and fall of pressure in said fluid chamber, means connecting the last mentioned piston to the pawl of the ratchet so that the ratchet wheel is moved to a new circuit completing position as the pressure of the fluid in the fluid chamber falls, and means actuated by rise of pressure in said fluid chamber beyond a certain value to energize each pair of welding points after the latter have been forced into suitable pressure engagement with the work to be welded.

3. In a welding device for making a series of welds in sequence, a fluid pressure system including means for causing a rise and fall of fluid pressure in said system, an indexing switch operated by rise and fall of pressure in the fluid pressure system, a plurality of electrically actuated valves each having a passage forming a portion of said fluid pressure system and controlled by said indexing switch, a series of welding electrodes and pistons for operating the same, means for conducting fluid from said valves to the electrode operating pistons, and electric circuits to the several electrically actuated valves, the circuit to each one of the electrically actuated valves being completed in a different position of the indexing switch.

4. In an electric welding machine adapted to make automatically a plurality of welds in sequence, a manifold for fluid, a first piston adapted to be moved in one direction to cause a rise in pressure in said manifold and to be moved in the opposite direction as the fluid pressure in the manifold falls, welding electrodes, a plurality of cylinders and pistons for moving the welding electrodes into pressure engagement with work to be welded, a plurality of electrically operated valve members connecting the manifold and plurality of cylinders, a plurality of electric circuits to said plurality of electrically operated valve members, electrically controlled means for actuating said first piston to cause pressure impulses in said manifold, a first switch forming a portion of circuits leading to said electrically controlled means for the first piston and forming portions of the plurality of circuits leading to the plurality of electrically actuated valve members, an indexing switch having a plurality of spaced contacts, all but one of which form portions of said plurality of electric circuits leading to the plurality of electrically operated valve members, and said one contact forming a portion of a manually completed electric circuit to said electrically controlled means for said first piston, said indexing switch also having other members forming portions of said circuits to said plurality of electrically actuated valve members and forming portions of circuits completed automatically leading to said electrically controlled means for actuating said first piston, means actuated by rise of pressure in the manifold for opening said first switch and actuated by fall of pressure in the manifold for closing said first switch, and means operated by rise and fall of pressure in the manifold for moving said indexing switch to a different contact position to sequentially complete the plurality of electric circuits to the plurality of electrically operated valves connecting the manifolds and plurality of electrode actuating pistons and cylinders.

MARCUS R. HARRIS.